United States Patent
Yoon

(10) Patent No.: US 12,517,938 B1
(45) Date of Patent: Jan. 6, 2026

(54) SMART RESOURCE OPTIMIZATION CACHING METHOD FOR LARGE LANGUAGE MODELS

(71) Applicant: Samsung Electronics Co., Ltd., Suwon-si (KR)

(72) Inventor: Ji-Hyeok Yoon, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/940,527

(22) Filed: Nov. 7, 2024

Related U.S. Application Data

(60) Provisional application No. 63/675,213, filed on Jul. 24, 2024.

(51) Int. Cl.
    *G06F 16/00* (2019.01)
    *G06F 16/3349* (2025.01)

(52) U.S. Cl.
    CPC .................. *G06F 16/3349* (2019.01)

(58) Field of Classification Search
    CPC .................................. G06F 16/3349
    See application file for complete search history.

(56) References Cited

U.S. PATENT DOCUMENTS

| | | |
|---|---|---|
| 10,102,844 B1 | 10/2018 | Mois et al. |
| 11,200,281 B2 | 12/2021 | Allen et al. |
| 2023/0084583 A1 | 3/2023 | Zeng et al. |
| 2023/0334072 A1 | 10/2023 | Matsuzawa et al. |
| 2025/0258848 A1* | 8/2025 | Szabo ............. G06F 16/3329 |

FOREIGN PATENT DOCUMENTS

KR           102155739 B1     9/2020

* cited by examiner

*Primary Examiner* — Ajith Jacob

(57) ABSTRACT

An electronic device comprises a memory and at least one processor coupled to the memory. The memory stores a database of previous natural language (NL) inputs to a first large language model (LLM) in a normalized format, and previous responses from the first LLM that correspond to the previous NL inputs in the normalized format. The at least one processor is configured to receive, from another electronic device, a new NL input for the first LLM, wherein the new NL input is converted into the normalized format by a second LLM, determine whether the database includes a matching previous NL input that matches the new NL input in the normalized format, and, if the database includes the matching previous NL input, send, to the other electronic device, a previous response from the first LLM that corresponds to the matching previous NL input as a response to the new NL input.

20 Claims, 7 Drawing Sheets

SMART RESOURCE OPTIMIZATION CACHING METHOD FOR LARGE LANGUAGE MODELS

CROSS-REFERENCE TO RELATED APPLICATION AND PRIORITY CLAIM

This application claims priority under 35 U.S.C. § 119(e) to U.S. Provisional Patent Application No. 63/675,213 filed on Jul. 24, 2024, which is hereby incorporated by reference in its entirety.

TECHNICAL FIELD

This disclosure relates generally to machine learning systems. More specifically, this disclosure relates to a smart resource optimization caching method for large language models.

BACKGROUND

In recent years, an increasing number of services and products using large language models (LLMs) have been released. Initially, attention was paid only to the potential capabilities of LLMs, but as the technology has advanced, various high quality applications and services that were previously difficult to implement have emerged that utilize the full potential of LLMs.

However, in order to provide such high quality services, a server-based LLM model on a vast scale is required, which leads to enormous costs for companies that operate such LLMs. Typically, those companies pass those costs on to their users, making it expensive to take advantage of the services offered by such high quality LLMs.

SUMMARY

This disclosure relates to a smart resource optimization caching method for large language models.

In a first embodiment, an electronic device comprises a memory and at least one processor operably coupled to the memory. The memory is configured to store a database of previous natural language (NL) inputs to a first large language model (LLM) in a normalized format, and previous responses from the first LLM that correspond to the previous NL inputs in the normalized format. The at least one processor is configured to receive, from another electronic device, a new NL input for the first LLM, wherein the new NL input is converted into the normalized format by a second LLM, determine whether the database includes a matching previous NL input that matches the new NL input in the normalized format, and based on a determination that the database includes the matching previous NL input, send, to the other electronic device, a previous response from the first LLM that corresponds to the matching previous NL input as a response to the new NL input.

In a second embodiment, a method performed by an electronic device comprises the steps of receiving, from another electronic device, a new NL input for a first LLM, wherein the new NL input is converted into a normalized format by a second LLM, determining whether a database of previous NL inputs to the first LLM in the normalized format and previous responses from the first LLM that correspond to the previous NL inputs in the normalized format includes a matching previous NL input that matches the new NL input in the normalized format, and based on a determination that the database includes the matching previous NL input, sending, to the other electronic device, a previous response from the first LLM that corresponds to the matching previous NL input as a response to the new NL input.

In a third embodiment, a non-transitory computer readable medium contains instructions that when executed cause at least one processor of an electronic device to receive, from another electronic device, a new NL input for a first LLM, wherein the new NL input is converted into a normalized format by a second LLM, determine whether a database of previous NL inputs to the first LLM in the normalized format and previous responses from the first LLM that correspond to the previous NL inputs in the normalized format includes a matching previous NL input that matches the new NL input in the normalized format, and based on a determination that the database includes the matching previous NL input, send, to the other electronic device, a previous response from the first LLM that corresponds to the matching previous NL input as a response to the new NL input.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
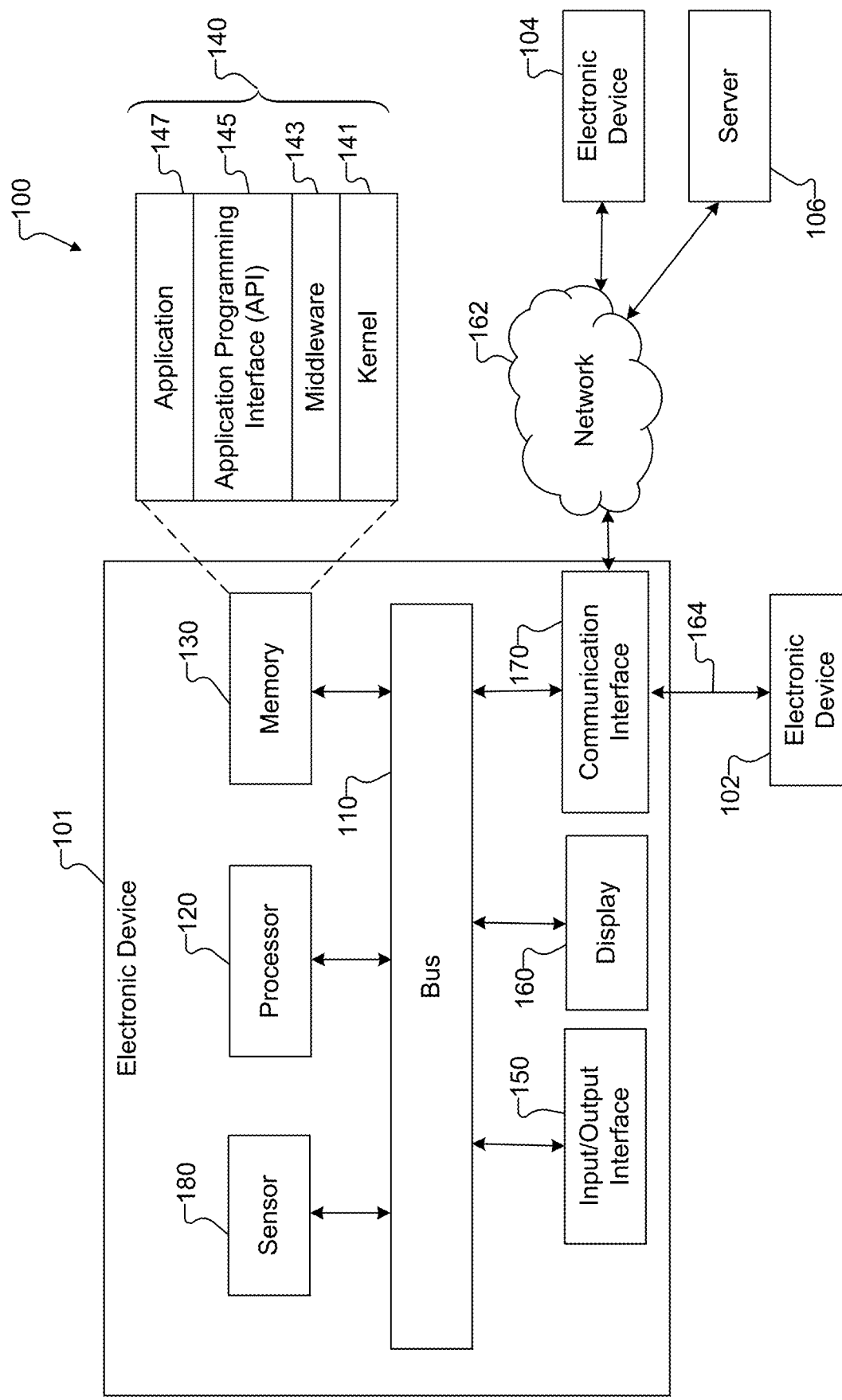
FIG. 1 illustrates an example network configuration including an electronic device in accordance with this disclosure.

FIGS. 1 through 7, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, in order to provide currently available high quality LLM services, a server-based LLM model on a vast scale is required, which leads to enormous costs for companies that operate such LLMs. Typically, those companies pass those costs on to their users, making it expensive to take advantage of the services offered by such high quality LLMs.

For example, for existing server-based LLMs services, network bandwidth costs and server processing costs are significant because requests are sent to the LLM server every time a user prompts the server-based LLM. This is exacerbated when the same request is submitted to the LLM server repeatedly (whether by different users or the same user). This causes unnecessary network traffic and increases server load. As a result, the efficiency of the service decreases, the response time is extended, and the user experience deteriorates.

Moreover, in spite of these costs there are frequently cases in which the quality of responses from the server-based LLM is lower than desired, raising questions about the value of the service. LLMs do not guarantee perfect natural language processing, and sometimes show "hallucination" behavior (in which inaccurate information is provided). The LLM service in these cases may not meet the level of quality that users or service providers want. For example, when a user's question is complicated or requires various contexts, the LLM may not be able to provide an appropriate response.

In addition, current server-based LLMs have difficulty fully understanding the intention or context of the user. This degrades the efficiency and reliability of the service when, for example, an LLM responds to a question the user did not ask, cannot respond at all, or provides different responses to the same question when prompted with that question again.

Existing LLM services also have shortcomings in their tone conversion functions, which often fail to meet individual needs of users. This is because the available tone styles are limited and lack diversity. For example, it is difficult for current LLMs to select a tone suitable for personal tastes or needs of a user because the LLM tone conversion function offers only limited categories. It is difficult to utilize the tone conversion function if a tone with the specific speech style or style that the user wants is not found on the LLM. Additionally, the LLM tone conversion function often provides a limited number of categories so it fails to offer tones of various styles to the user (i.e., users are not offered diverse choices). As a result, LLM tone conversion functionality is not utilized very often.

Embodiments of the present disclosure provide systems and methods that efficiently utilize LLMs to provide high-quality services while reducing costs as compared to current implementations of server-based LLM services. For example, embodiments of the present disclosure that operate in a service environment with server-based LLMs facilitate caching to reuse previously generated LLM responses to reduce the time and cost required for response generation, and create a stylized context using cached responses to increase usability.

Some embodiments of the present disclosure include a conversion unit that changes the natural language input of a user requested through LLM into a consistent format, a detection unit for detecting the expected response of the converted request in the database, a generation unit that requests multiple response generations from LLM when not detected, a management unit for storing and managing generated responses, and a real-time LLM caching device for resource efficiency consisting of a conversion unit for converting expressions.

Note that while some of the embodiments discussed below are described in the context of use in consumer electronic devices (such as smartphones), this is merely one example. It will be understood that the principles of this disclosure may be implemented in any number of other suitable contexts and may use any suitable device or devices. Also note that while some of the embodiments discussed below are described based on the assumption that one device (such as a server) implements a machine learning model that is deployed to one or more other devices (such as one or more consumer electronic devices), this is also merely one example. It will be understood that the principles of this disclosure may be implemented using any number of devices, including a single device that both trains and uses a machine learning model. In general, this disclosure is not limited to use with any specific type(s) of device(s).

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described in more detail below, the processor 120 may perform various operations related to smart resource optimization caching for LLMs. For example, as described below, the processor 120 may receive inputs (such as natural language queries for an LLM), perform preprocessing and tone extraction on the inputs, search a cache for responses matching the preprocessed inputs, prompt an LLM for responses to the preprocessed inputs if no matching responses are found in the cache, and apply extracted tones to responses to the inputs. The processor 120 may also instruct other devices to perform certain operations (such as preprocessing, tone extraction, and tone application) or display content on one or more displays 160.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support various functions related to smart resource optimization caching for LLMs. For example, the application 147 includes one or more applications supporting the receipt of inputs (such as natural language queries for an LLM), perform preprocessing and tone extraction on the inputs, search a cache for responses matching the preprocessed inputs, prompt an LLM for responses to the preprocessed inputs if no matching responses are found in the cache, and apply extracted tones to responses to the inputs. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more imaging sensors.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described in more detail below, the server 106 may perform various operations related to smart resource optimization caching for LLMs. For example, as described below, the server 106 may receive inputs (such as natural language queries for an LLM), perform preprocessing and tone extraction on the inputs, search a cache for responses matching the preprocessed inputs, prompt an LLM for responses to the preprocessed inputs if no matching responses are found in the cache, and apply extracted tones to responses to the inputs. The server 106 may also instruct other devices to perform certain operations (such as preprocessing, tone extraction, and tone application) or display content on one or more displays 160.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Embodiments of the present disclosure generally relate to systems and methods for recycling LLM responses to reduce the cost and latency of generating a response to an inquiry using an LLM. This may include: preprocessing natural language (NL) inputs to an LLM to identify requests that are identical to previous requests input to an LLM, and to reuse stored responses from the LLM to those identified requests; converting NL input sentences into a normalized format (or systematized format) for better accuracy and efficiency in identifying identical requests; determining whether an LLM needs to be used for a particular request, and bypassing the LLM for requests that do not require it; generating and storing responses using an LLM to secure diversity, and then deciding whether to additionally generate responses based on the frequency of identical requests, and randomly providing one of the stored diverse responses; and distinguishing between short-term and long-term data lifecycles, and storing responses accordingly in separate databases for optimized access and management.

In these embodiments, an LLM may be used to convert NL inputs into a normalized format. The LLM used for this conversion may be different from the LLM used to respond to the original inquiry. For example, a server-based (i.e., large) LLM may be used to respond to inquiries, while a smaller, locally implemented LLM (e.g., implemented on a user device) may be sufficient to perform the format conversion.

Figure 2A:
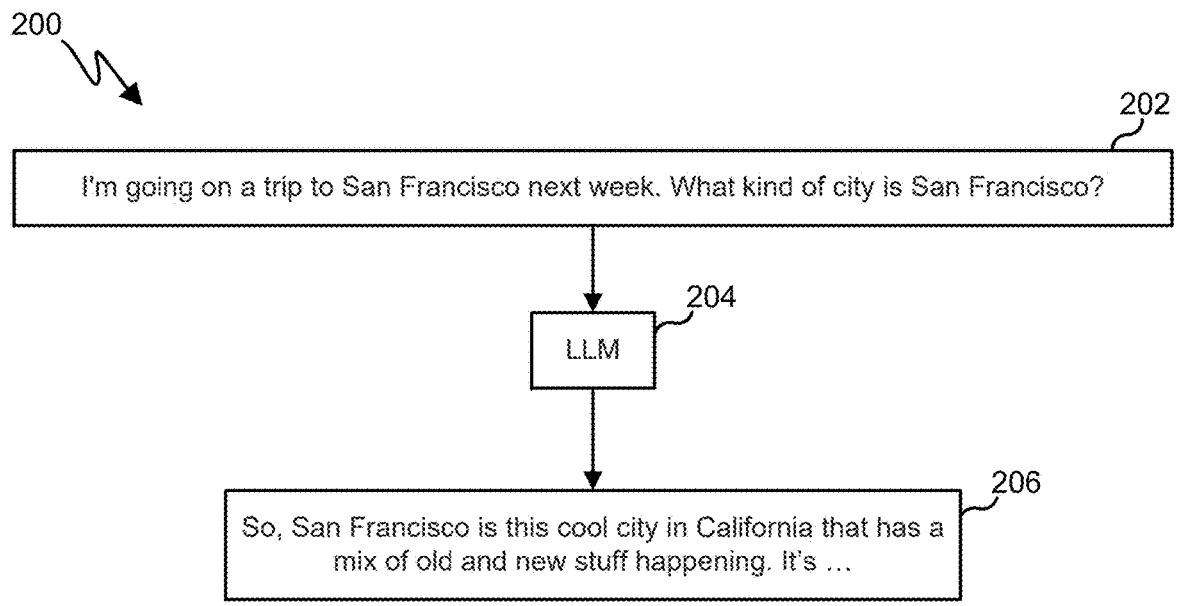
FIGS. 2A and 2B illustrate example LLM service flows and in accordance with this disclosure.
Figure 2B:
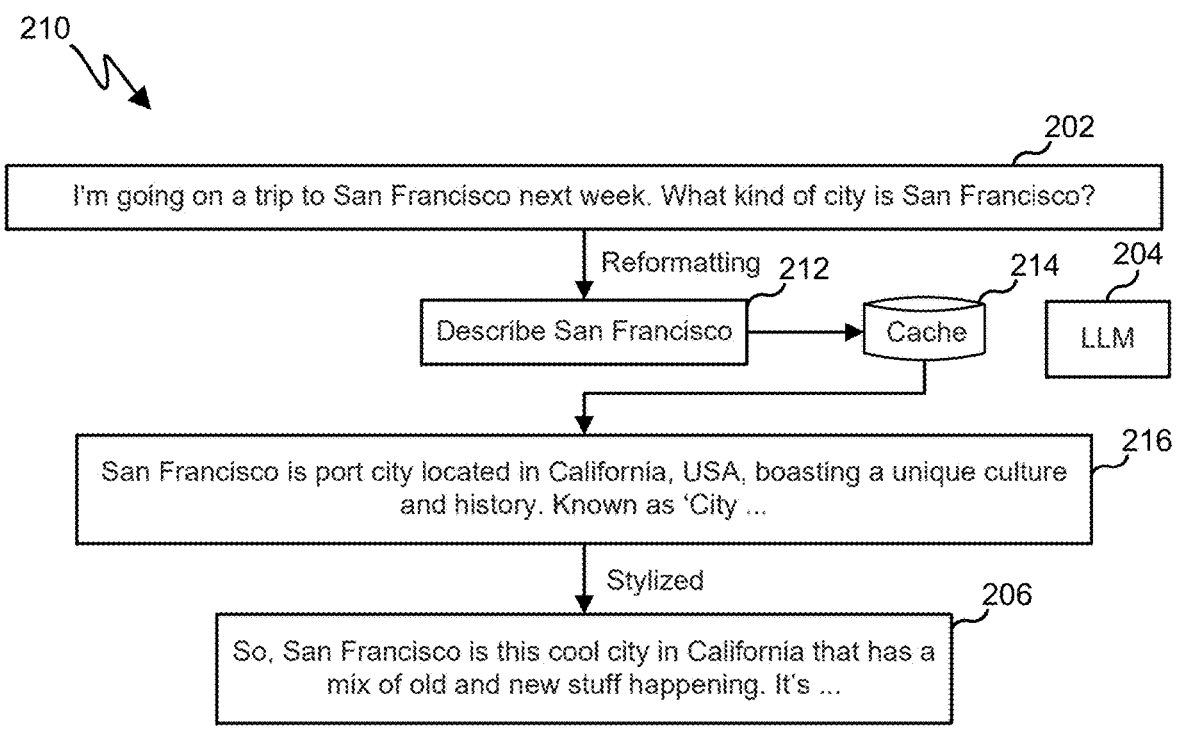

FIGS. 2A and 2B illustrate example LLM service flows 200 and 210 in accordance with this disclosure. In the LLM service flow 200 of FIG. 2A, a user provides prompt 202 as an input to an LLM 204, and receives a response 206 from the LLM 204. In this example, the LLM 204 may be an existing server-based LLM. In this example, the LLM 204 interprets the prompt 202 and generates the response 206 from scratch. If the user were to prompt the LLM 204 again with the identical prompt 202, the LLM 204 would repeat the work of interpreting the prompt 202 and generating the response 206 from scratch—in some cases, the LLM 204 may even generate a different response due to the operating principles of generative models such as LLMs. Similarly, if multiple users were to pose similar questions to the LLM 204, the LLM 204 would have to individually interpret each prompt and generate each response, even if the responses were very nearly identical. This is inefficient, costly, and time consuming.

The LLM service flow 210 of FIG. 2B represents a more efficient alternative to service flow 200. In this example, the user has the same prompt 202 for the LLM 204. Instead of directly inputting the prompt 202 to the LLM 204, however, the user sends the prompt 202 through a system according to the present disclosure—this may be intentional on the part of the user, or may be an operation invisible to the user. The system converts the prompt 202 into a normalized format prompt 212. The system includes a cache 214 that stores normalized format prompts that have previously been input to the LLM 204, and the corresponding responses to those prompts from the LLM 204. The system searches this cache 214 for a cached prompt that matches the normalized format prompt 212. If a matching cached prompt is found in the cache 214, then the cached response 216 that corresponds to the normalized format prompt 212 may be provided to the user as a response, bypassing the LLM 204. In some embodiments, the system may also stylize the cached response 216 to apply a tone that is consistent with the tone of the original user prompt 202, thus converting the cached response 216 into, e.g., the response 206. The system used in LLM service flow 210 takes advantage of work that has already been done by the LLM 204 rather than unnecessarily engaging the LLM 204 to repeat that work, thereby saving time and expense.

Further embodiments of the present disclosure extend the LLM service flow 210, and include processes to determine, based on user input, whether response recycling is possible and whether the LLM can process the user input at all. It is desirable to distinguish between requests for which LLM responses cannot be recycled (e.g., due to changes in proper nouns or personal information) and requests that the LLM cannot handle at all. For example, it is difficult to recycle requests for summarizing user inputs. In addition, requests that require real-time information (e.g., traffic conditions, weather forecasts, stock prices, etc.) or dynamic web pages, security, and privacy are difficult for LLMs to handle. On the other hand, it is desirable to connect image processing, speech recognition/synthesis, video processing, etc. to other more efficient servers or modules than the LLM.

Figure 3:
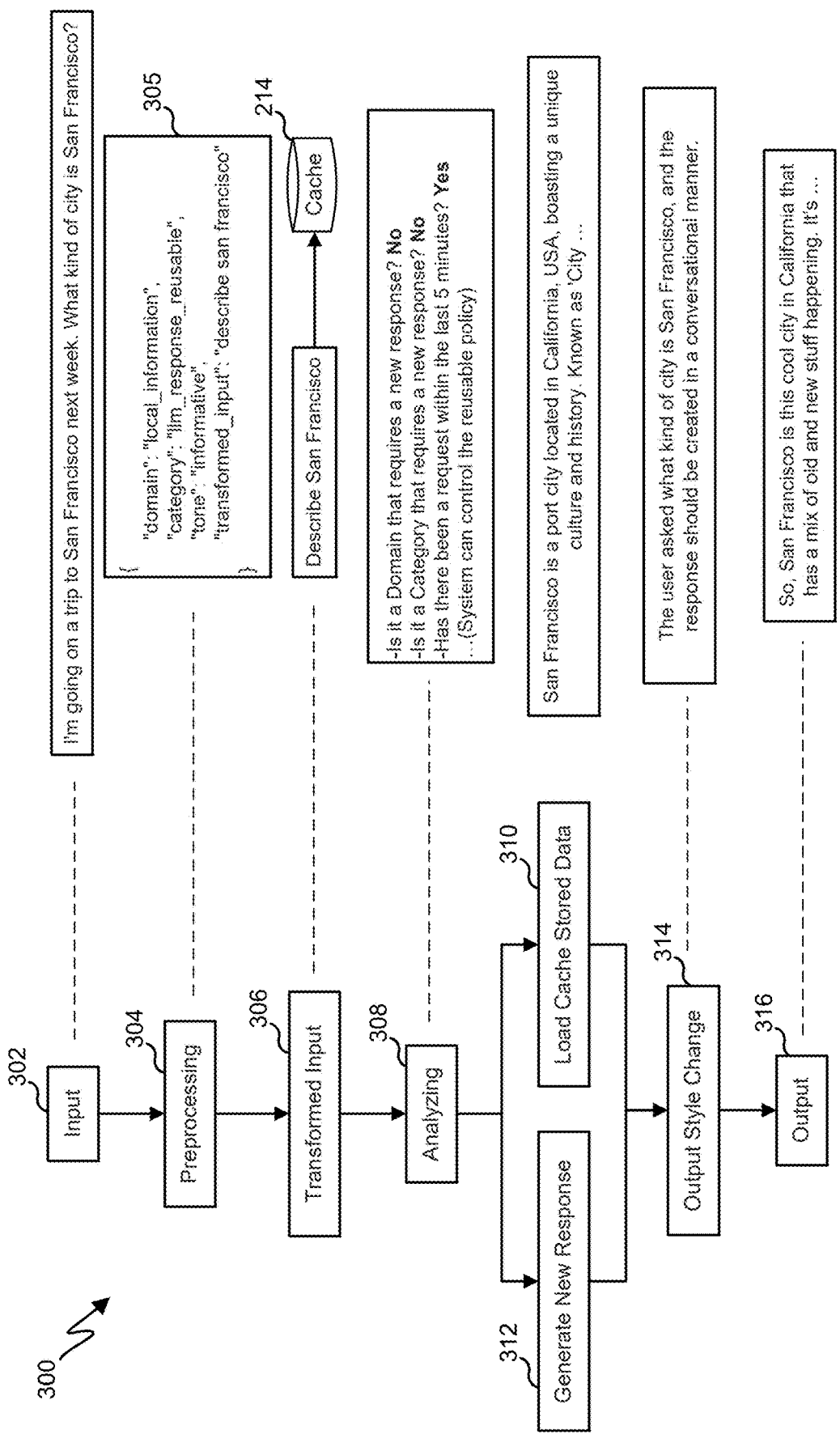
FIG. 3 illustrates an example LLM response recycling process in accordance with this disclosure.

FIG. 3 illustrates an example LLM response recycling process 300 in accordance with this disclosure. The process 300 may be an extension of the LLM service flow 210 of FIG. 2B. For ease of explanation, the process 300 is described as performed by a system involving the use of a combination of the electronic device 101 and the server 106 in the network configuration 100 of FIG. 1. However, the process 300 may be used with any other suitable combination of devices (such as multiple servers 106) or with any one suitable electronic device (such as the server 106 or the electronic device 101) and in any other suitable system(s).

As shown in FIG. 3, starting at block 302 the system takes an input from a user. The input is a natural language prompt for a server-based LLM (e.g., the prompt 202 of FIGS. 2A and 2B). At block 304 the system preprocesses the input. This preprocessing may involve classifying or categorizing the input (e.g., into a domain such as "weather", "cooking", "science", "health", "travel", etc., and category such as "LLM response is reusable", "Not recycled", "LLM cannot handle", etc.), determining a tone of the input, and transforming (or converting) the input into a normalized format, resulting in transformed input 306, which may be included in a set of preprocessed information 305. The preprocessed information 305 may be in the form of, e.g., a JSON object or XML object. The preprocessed information 305 object may include a domain and a category as keys in addition to the transformed input 306.

The system analyzes the transformed input 306 at block 308 to determine whether a stored previous response from the LLM can be recycled (e.g., by searching a cache 214 for a stored previous input that matches the transformed input 306), or whether a new response from the LLM is needed (e.g., if no matching previous input is found in the cache 214, or based on the domain, category, or other classifiers of the input identified during preprocessing). Although not illustrated here, this analysis may also determine whether the LLM is unable to handle the input (e.g., based on the domain, category, or other classifiers of the input), in which case the process would terminate.

If the system determines that response recycling is possible (e.g., if a matching previous input is found in the cache 214), then at block 310 the system may load the cached previous response of the LLM that corresponds to the matching previous input. If the system determines that response recycling is not possible, then at block 312 the system may pass the transformed input 306 to the LLM as a prompt to obtain a new response from the LLM. At block 314, the response (either the cached previous response from block 310 or the new response from block 312) may be post-processed to apply an appropriate tone to the response (e.g., based on the tone of the input identified during preprocessing), resulting in a final output 316 that is provided to the user.

Although FIG. 3 illustrates one example of an LLM response recycling process 300, various changes may be made to FIG. 3. For example, the process 300 may also be performed using a distributed architecture. For instance, preprocessing 304 can be executed on a client electronic device (such as electronic device 101) or at a server (such as server 106). When executed by the server, the server may provide the client electronic device with the preprocessed information 305 including the transformed input 306.

Figure 4:
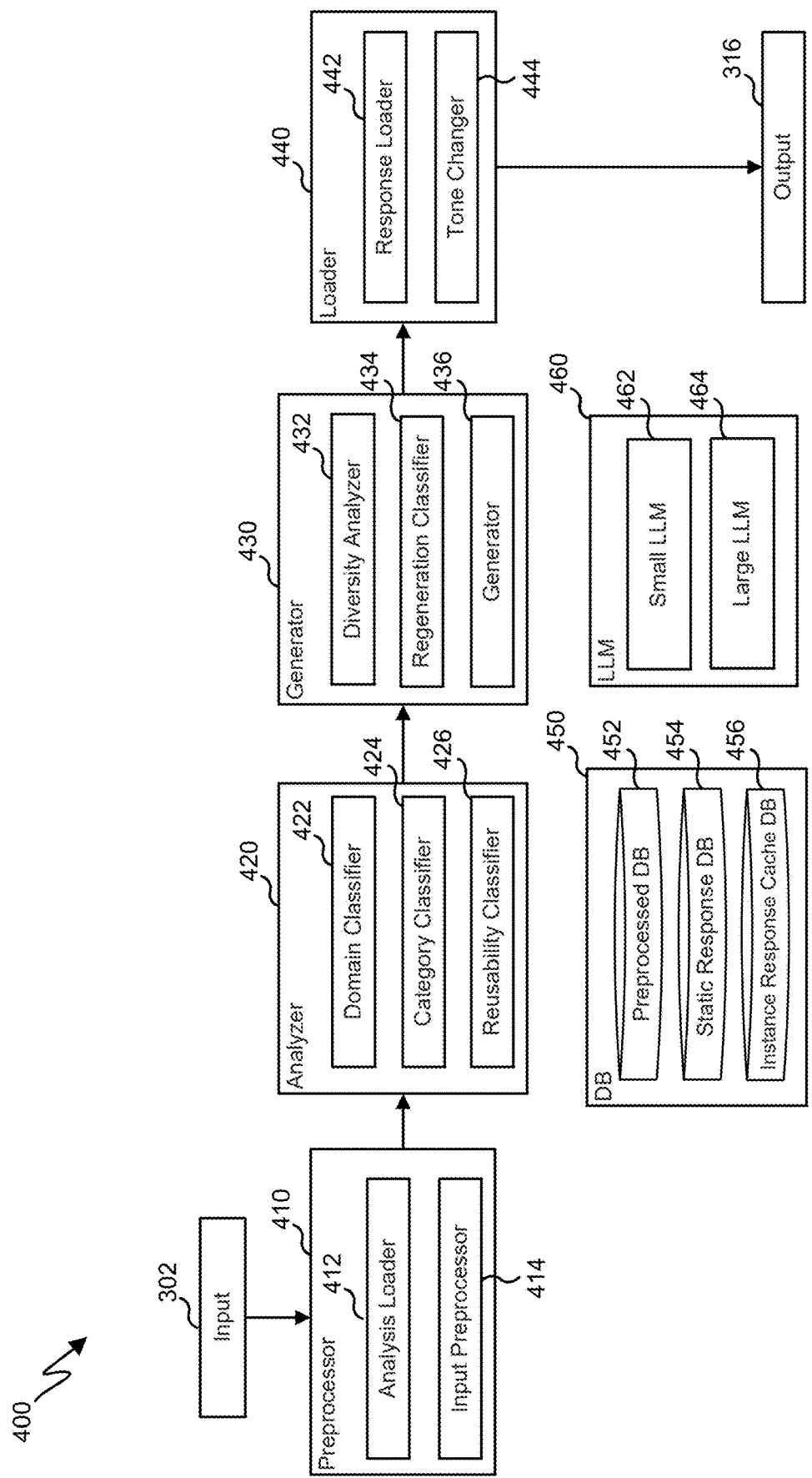
FIG. 4 illustrates an example LLM response recycling system architecture in accordance with this disclosure.

FIG. 4 illustrates an example LLM response recycling system architecture 400 in accordance with this disclosure. The architecture 400 may be used to implement the LLM response recycling process 300 of FIG. 3. For ease of explanation, the architecture 400 is described as implemented by a system involving the use of a combination of the electronic device 101 and the server 106 in the network configuration 100 of FIG. 1. However, the architecture 400 may be implemented with any other suitable combination of devices (such as multiple servers 106) or with any one suitable electronic device (such as the server 106 or the electronic device 101) and in any other suitable system(s).

As shown in FIG. 4, the architecture 400 may be broken down into a preprocessor 410, an analyzer 420, a generator 430, and a loader 440, which operate with the use of various databases (DBs) 450 and LLMs 460. In this example, the LLMs include a small LLM 462, which may be a relatively low power, lightweight LLM that can be used at a low or no cost (and which may be implemented on a user device, such as a smartphone or personal computer), and a large LLM 464, which may be a high power cloud (i.e., server-based) LLM (e.g., the LLM 204 of FIGS. 2A and 2B). Altogether, the architecture 400 functions on a natural language user input (e.g., the input 302) to produce a natural language output (e.g., the output 316).

The preprocessor 410 may perform the functions of the preprocessing block 304 of FIG. 3. For example, the preprocessor 410 processes the natural language input 302 and generates a set of preprocessed information 305 that includes, e.g., domain, category, and tone information extracted from the input 302, as well as a transformed input 306 in a normalized format. In this example, domain information relates to the topic of the request in the input 302—e.g., the domain could be weather, health, travel, movies, or the like. Category information relates to how the request of the input 302 should be handled by the system—e.g., whether an LLM is incapable of handling the request ("LLM cannot handle"), whether the request is likely to have a reusable response ("LLM response reusable" or "Not recycled"), or whether use of an LLM is not ideal to handle the request ("Not requiring LLM"), i.e., when a dedicated module for functions such as speech recognition or image processing would be more appropriate).

The preprocessor 410 may be further broken down into an analysis loader 412 and an input preprocessor 414. As discussed below, the input preprocessor 414 may operate using one of the LLMs 460. Since the main purpose of the present system is to reduce the cost and latency incurred by the use of LLMs, it is desirable to reduce the number of times the input preprocessor 414 is called upon to use an LLM. To that end, it is recognized that since services or devices implementing the architecture 400 are used by multiple users, functionally identical requests may be input to the system with only slight variations in natural language (e.g., variations in punctuation). Therefore, the analysis loader 412 performs simple preprocessing such as special character removal and space adjustment on the input 302 text based on predefined rules—for example, the inputs "How are you?" and "How are you!" would both result in "How are you" after this preprocessing—and then searches the preprocessed DB 452 based on the result of this simple preprocessing.

Figure 5:
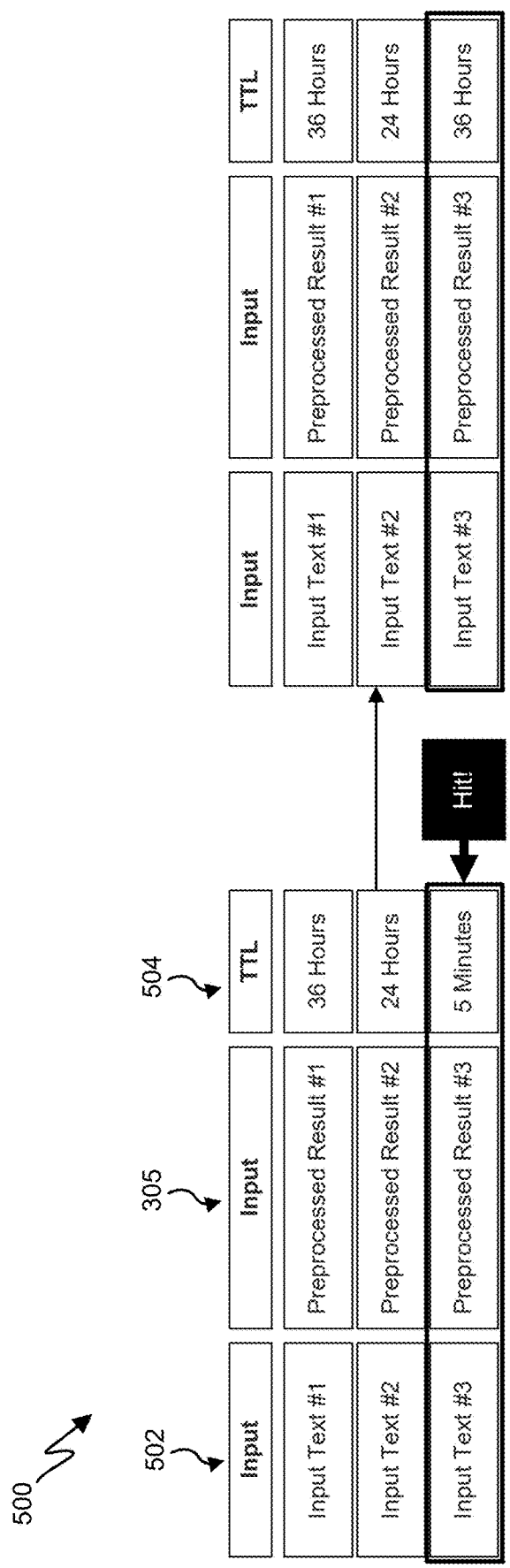
FIG. 5 illustrates an example of contents of the preprocessed DB in accordance with this disclosure.

FIG. 5 illustrates an example 500 of contents of the preprocessed DB 452 in accordance with this disclosure. As shown in FIG. 5, the preprocessed DB 452 stores previous inputs 502 that have been simply preprocessed by the analysis loader 412 (that is, inputs consisting of text from which special characters or spaces are simply removed from the user's natural language input) and preprocessed information 305 that corresponds to those previous inputs. The analysis loader 412 searches the preprocessed DB 452 for a stored previous input 502 that matches the result of the simple preprocessing on input 302. In the example of FIG. 5, "Input text #3" is a match, meaning that the same question has been input to the system before. Accordingly, the corresponding "Preprocessed result #3" may be used as the preprocessor information 305 that is output by the preprocessor 410, and the input preprocessor 414 does not need to be invoked.

Since a text string becomes the Key value in the preprocessed DB 452, a Key-Value type DB may be used, in which case there is no process for loading data in advance. Instead, new entries may be added to the DB as they are generated by the input preprocessor 414. If the natural language input and result values are stored indefinitely, however, it may cause a problem in the DB maintenance cost. To address this, entries are stored with a corresponding Time To Live (TTL) value 504 that indicates a time for which the entry is stored. When the analysis loader 412 searches the preprocessed DB 452 and finds a match, the TTL value 504 may be increased to extend the life of the data. In the example shown in FIG. 5, when "Input text #3" is a match for a search of the preprocessed DB 452 the corresponding TTL value 504 for that entry is 5 minutes, but it is is initialized to 36 hours after the successful match. In this way, entries corresponding to common NL inputs 302 are maintained in the preprocessed DB 452, while entries corresponding to infrequent NL inputs 302 are purged to conserve resources.

Returning to FIG. 4, if the analysis loader 412 does not successfully find a match in the preprocessed DB 452, then the input 302 is passed to the input preprocessor 414. Since the main purpose of the present system is to reduce the cost and latency incurred by the use of LLMs, it is desirable to convert the input text into a standardized (or normalized) style so that similar inputs may be identified for recycling responses to those inputs. Since the user input 302 is in natural language, it may contain too much or too little information as compared to the amount of information needed to obtain the response the user is seeking from an LLM. In addition, an input having the same meaning can be composed of various different structures and words in natural language. For example, the inputs "Tomorrow's weather.", "It's hot today. Tell me tomorrow's weather.", and "How's the weather tomorrow?" are functionally identical—they are all a request for the tomorrow's weather forecast. Accordingly, a single input in a normalized format, such as "Tomorrow's forecast", could represent all of the original inputs in this example—that is, a response from the LLM to the prompt "Tomorrow's forecast" would satisfy each of the original inputs. Additionally, while each original natural language input and its corresponding response from the LLM could be stored in a cache for potential response recycling, this would only allow responses to be recycled from the cache when exactly the same question is input in the future. If a future input seeks the same information using a different natural language formulation (e.g., "What is tomorrow's weather?"), no match would be found in the cache and a new response would be requested from the LLM. Therefore, storing the single normalized format input and its corresponding response from the LLM in the cache, then converting future natural language inputs into the normalized format (e.g., converting "What is tomorrow's weather?" into the normalized format of "Tomorrow's forecast") before searching the cache will allow for response recycling for various permutations of natural language inputs seeking the same information.

As a method of preprocessing natural language inputs, a Rule Base, machine learning (ML) model, deep learning model, or generative artificial intelligence (AI) technology can be used. The present example uses an LLM, which is a generative AI model that is able to summarize natural language well without damaging the meaning of the natural language. An LLM as used by the input preprocessor 414 not only changes the sentence to facilitate searching for similar previous inputs, but it also has the ability to perform sentence classification to, e.g., extract category, domain, and tone information from the natural language input 302. Accordingly, the input preprocessor 414 may prompt the LLM with the natural language input 302 and a set of possible category and domain classifications according to a predetermined standard, and instruct the LLM to extract the tone, domain, and category of the user input 302 while also converting the input 302 into the normalized format. The extracted tone of the user input may be reused when generating a response, as discussed further below.

In some embodiments, the input preprocessor 414 may use a small LLM 462 to perform the above preprocessing. The small LLM 462 may be an on-device LLM, as the performance of recent on-device LLM models is rapidly increasing, and a task such as analyzing a natural language user query for sentence classification can be successfully handled by on-device LLMs. Use of an on-device LLM may reduce the cost of LLM usage to essentially zero. However, if an LLM with a small number of parameters to be used is a small LLM 462 that cannot achieve high performance, then only a model that converts to a normalized form through fine tuning can be used. In other embodiments, the input preprocessor 414 may use a large LLM 464, which may be a server-based (or cloud) LLM, to perform the above preprocessing. When using a cloud LLM, the generation time and cost are determined by the number of characters or tokens generated by the LLM. Therefore, rather than using a query that requires the generation of a long sentence, it is possible to save cost and time if the LLM is only instructed to perform the preprocessing analysis to extract category, domain, and tone information (i.e., if the LLM is not instructed to provide a response to the query). Accordingly, the objective of the present disclosure to reduce cost and latency incurred by LLM use may still be achieved through recycling of LLM responses even if a server-based LLM is used by the input preprocessor 414 at this stage.

Regardless of which embodiment is used, the preprocessor 410 outputs preprocessed information 305 for the input 302, which may be, e.g., a JSON object containing domain, category, and tone information for the input 302, as well as a transformed input 306 in the normalized format. The preprocessed information 305 is then passed to the analyzer 420.

In the analyzer 420, domain and category information extracted in the preprocessed information 305 may be utilized to determine the reusability of an LLM response to a query in the transformed input 306 according to a predefined rule. In some cases, multiple queries may come in one transformed input 306, and, if that is the case, then the transformed input 306 can be divided into multiple queries, and reusability is analyzed for each query. The analyzer 420 may determine that a query is short-term reusable, long-term reusable, non-reusable, or that no usage of LLM is involved. The analysis result may be added to the preprocessed information 305 (e.g., as an appended entry in a JSON object representing the preprocessed information 305 for a given input 302).

The analyzer 420 may be further broken down into a domain classifier 422, a category classifier 424, and a reusability classifier 426. The domain classifier 422 may use predefined criteria to associate a reusability status with the domain extracted in the preprocessed information 305. For example, the domain classifier 422 may associate short-term reusability status with the "weather" domain, as weather frequently changes. Meanwhile, the domain classifier 422 may associate long-term reusability status with the "cooking" domain, as cooking recipes and ingredients are unlikely to need frequent updates. A system designer may predefine the reusability status associated with each domain in the domain classifier 422.

The category classifier 424 may use predefined criteria to associate a reusability status with the category extracted in the preprocessed information 305. For example, the category classifier 424 may associate non-reusable status with the "LLM cannot handle" and "Not recycled" categories, and no usage of LLM status with the "Not requiring LLM" category. A system designer may predefine the reusability status associated with each category in the category classifier 424.

The reusability classifier 426 determines the final reusability status for a query by combining the results of the domain classifier 422 and category classifier 424 and considering optional user or LLM service provider preferences. For example, a query about the weather forecast may be in the "weather" domain and the "LLM cannot handle" category (as weather forecasts are reliant on real-time data which is challenging for LLMs to provide). For this query, the predefined criteria in the domain classifier 422 causes it to associate short-term reusability status with the "weather" domain while the predefined criteria in the category classifier 424 causes it to associate non-reusable status with the "LLM cannot handle" category. The reusability classifier 426 may combines these two determinations and assign non-reusable status to the query. In general, a determination by the category classifier 424 of non-reusable status or no usage of LLM status may supersede a short-term or long-term reusability status determination by the domain classifier 422.

However, an LLM service provider may add functionality to the LLM such as an external connection to external real-time data sources (e.g., connections to weather forecast websites) or a module for processing real-time data, and may decide to separately define a preference for queries in a corresponding domain (e.g., the "weather" domain) to be classified as short-term reusable or long-term reusable. In such a case, the reusability classifier 426 may determine that this service provider preference supersedes the determinations of one or both of the domain classifier 422 and category classifier 424. For example, for the "weather" domain, the reusability classifier 426 may allow the service provider preference to override the determination of the domain classifier 422 in all cases, and to override the determination of the category classifier 424 for the "LLM cannot handle" and "Not recycled" categories, but not for the "Not requiring LLM" category. In a similar manner, a user that provides the input 302 may be able to apply their own preferences via the reusability classifier 426, since standards for expected responses from an LLM may differ by user. Since the reusability classifier 426 deals with numerous cases, it may be implemented through a decision tree rather than simple program logic to derive the result value. The preprocessed information 305 with the reusability analysis result from the analyzer 420 is passed to the generator 430.

In the present system, previous responses generated by an LLM are recycled, but providing only the same response to a user who expects a new response for each request may hinder the diversity expected in the LLM. Therefore, for each new input 302, the generator 430 analyzes whether various responses should be provided, determines whether generation is necessary in advance, and generates them. However, simply judging whether various responses should be provided may reduce efficiency. Therefore, the generator 430 is responsible for analyzing how many diverse responses should be generated and provided, whether various responses are required, and regenerating them according to the results. The generator 430 may be further broken down into a diversity analyzer 432, a regeneration classifier 434, and a generator 436.

Figure 6:
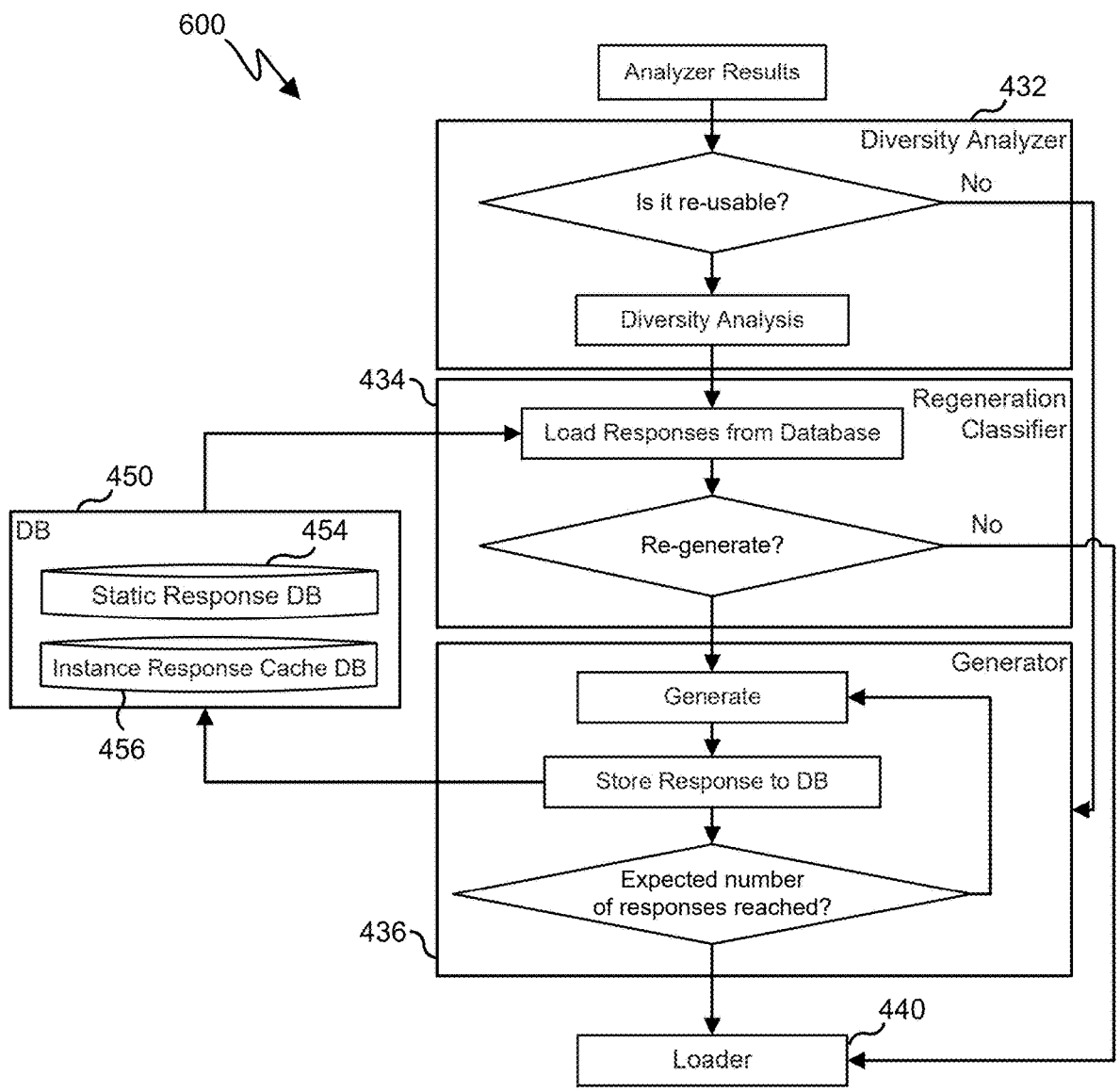
FIG. 6 illustrates an example flow chart for operation of the generator in accordance with this disclosure.

FIG. 6 illustrates an example flow chart 600 for operation of the generator 430 in accordance with this disclosure. As shown in FIG. 6, the diversity analyzer 432 verifies the diversity of queries based on the analysis results from the analyzer 420. Responses can be continually recycled once generated according to the query, or different responses may be given for each query. There are many ways to distinguish between queries, but in the present example the distinction is based on the reusability status determined by the analyzer 420. If the reusability status is non-reusable, then the diversity analyzer 432 proceeds directly to the generator 436, discussed further below. Otherwise, a basic number of loaded responses is set according to whether the results are analyzed as short-term or long-term, and the number of loaded responses is dynamically adjusted according to the frequency of queries by the user.

In the case of short-term reusability status, even though the associated domains may relate to information that changes frequently (e.g., weather, politics, sports, etc.), the satisfaction level of users may still be improved by generating and returning varied responses to the same query. Accordingly, a small number of loaded responses (e.g., 5) may be pre-generated for the same query—the actual number can be adjusted by the administrator of the present system, and during actual operation the value may increase or decrease depending on how frequently the same question is asked (i.e., how frequently the same transformed input 306 is received). Responses classified as short-term reusable have different life cycles, so they are stored in the instance response cache DB 456, where a TTL can be set for each response.

In the case of long-term reusability status, the associated domains may relate to static information (e.g., general knowledge, cooking, history, etc.). Since static information does not change over time, a response can be reused for a long time once it is generated. However, depending on the query, even if a user asks for the same purpose they may want various different answers. Accordingly, a relatively large number of loaded responses (e.g., 10) may be pre-generated for the same query—the actual number can be adjusted by the administrator of the present system. Responses classified as long-term reusable are stored in the static response DB 454, where they may be continuously stored and reused since they do not change over time.

As shown in FIG. 6, after the diversity analysis is completed, the regeneration classifier 434 checks data in the target database based on the reusability analysis results and determines whether regeneration is necessary. That is, for short-term reusable queries, the regeneration classifier 434 checks data in the instance response cache DB 456, and for long-term reusable queries, the regeneration classifier 434 checks data in the static response DB 454. The regeneration classifier 434 first checks whether there are any stored previous responses to the query in the target database, and, if so, how many stored responses there are. If there are stored responses (and the number of stored responses meets the number of loaded responses set by the diversity analyzer 432), then re-generation of responses is not needed, and the system allows the loader 440 to load one of the stored responses. If there are no stored responses (or fewer stored responses than the number of loaded responses set by the diversity analyzer 432), then the generator 436 is invoked to generate new responses. In some cases, the regeneration classifier 434 may also include logic to determine whether to increase the number of loaded responses based on repeated queries within a time frame in order to further enhance diversity for queries that are frequently submitted by users.

In the generator 436, a request for generation of a new response to the query (i.e., the transformed input 306) is sent to the LLM as many times as specified by the regeneration classifier 434 (e.g., as many times as necessary to meet the number of loaded responses set by the diversity analyzer 432). The responses received from the LLM are stored in the appropriate database. Long-term reusable responses are stored in the static response DB 454, and short-term reusable responses are stored in the instance response cache DB 456. For short-term reusable responses, the TTL value in the instance response cache DB 456 is set for a certain period of time. The TTL time may not vary with the analysis result of domain or category because the present system is intended to reduce cost and latency in an unspecified service, which means it cannot predict which service will be used frequently. Therefore, although the TTL can be adjusted, it is typically designated as, e.g., 10 minutes. After a new response has been stored, the generator 436 checks the number of responses stored in the target DB for the same query (i.e., for the transformed input 306). This may be unnecessary for long-term reusable responses since there is no change to the static response DB 454 unless a user deletes responses directly, but for short-term reusable responses, because responses may be automatically deleted due to TTL expiring, after the new response is saved the number of saved responses is reviewed. If the number of saved responses has not reached the required number of responses, then another request for generation of a new response is submitted to the LLM. The system then allows the loader 440 to load one of the stored responses.

Referring again to FIG. 4, in the loader 440, the stored response from the DB is loaded and converted into the expected tone entered by the user. The loader 440 be further broken down into a response loader 442 and a tone changer 444. The response loader 442 retrieves a stored response corresponding to the transformed input 306 from the appropriate DB (e.g., the instance response cache DB 456 for inputs with short-term reusability status, and the static response DB 454 for inputs with long-term reusability status). When the DB is queried for a stored response matching the transformed input 306, if there are multiple stored responses for the same transformed input 306, then one may be randomly selected and loaded from the DB. In the case of short-term reusable responses, the TTL associated with all entries in the instance response cache DB 456 that match the transformed input 306 may be reinitialized. In this way, potential costs may be avoided for re-generating a new response to a transformed input 306 when a particular one of the stored responses is not randomly selected for its entire TTL.

The tone changer 444 performs the task of converting the loaded response into a natural language response having an appropriate tone according to the tone expected by the user (i.e., the tone extracted during preprocessing). While the present system intends to recycle stored previous responses to a normalized version of a user input, these stored responses may be awkward, and it may degrade the user experience to directly provide such responses. Accordingly, the tone changer 444 converts the response to something the user would expect based on the tone of their input. Tone changing is a relatively easy task among tasks that use LLMs, and can be accomplished using a small LLM 462. Depending on the case, large LLMs 464 may be used for tone conversion, but recently, many models that provide tone conversion on-device have already been commercialized, so in order to reduce costs, an on-device small LLM 462 is used in this example. The result of the tone changer 444 can also be reused for future inputs having the same tone. Accordingly, for a stored response on which tone conversion has been performed, the resulting tone-converted response may be stored in the DB alongside the stored response. Then, when a transformed input 306 having the same tone arrives in the future, tone conversion need not be performed, and instead the stored tone-converted response may be retrieved from the DB immediately.

Although FIG. 4 illustrates one example of an LLM response recycling system architecture 400, various changes may be made to FIG. 4. For example, various components and functions in FIG. 4 may be combined, further subdivided, replicated, or rearranged according to particular needs. Also, one or more additional components and functions may be included if needed or desired.

It should be noted that the functions shown in FIGS. 2A through 6 or described above can be implemented in an electronic device 101, 102, 104, server 106, or other device(s) in any suitable manner. For example, in some embodiments, at least some of the functions shown in FIGS. 2A through 6 or described above can be implemented or supported using one or more software applications or other software instructions that are executed by the processor 120 of the electronic device 101, 102, 104, server 106, or other device(s). In other embodiments, at least some of the functions shown in FIGS. 2A through 6 or described above can be implemented or supported using dedicated hardware components. In general, the functions shown in FIGS. 2A through 6 or described above can be performed using any suitable hardware or any suitable combination of hardware and software/firmware instructions. Also, the functions shown in FIGS. 2A through 6 or described above can be performed by a single device or by multiple devices.

Figure 7:
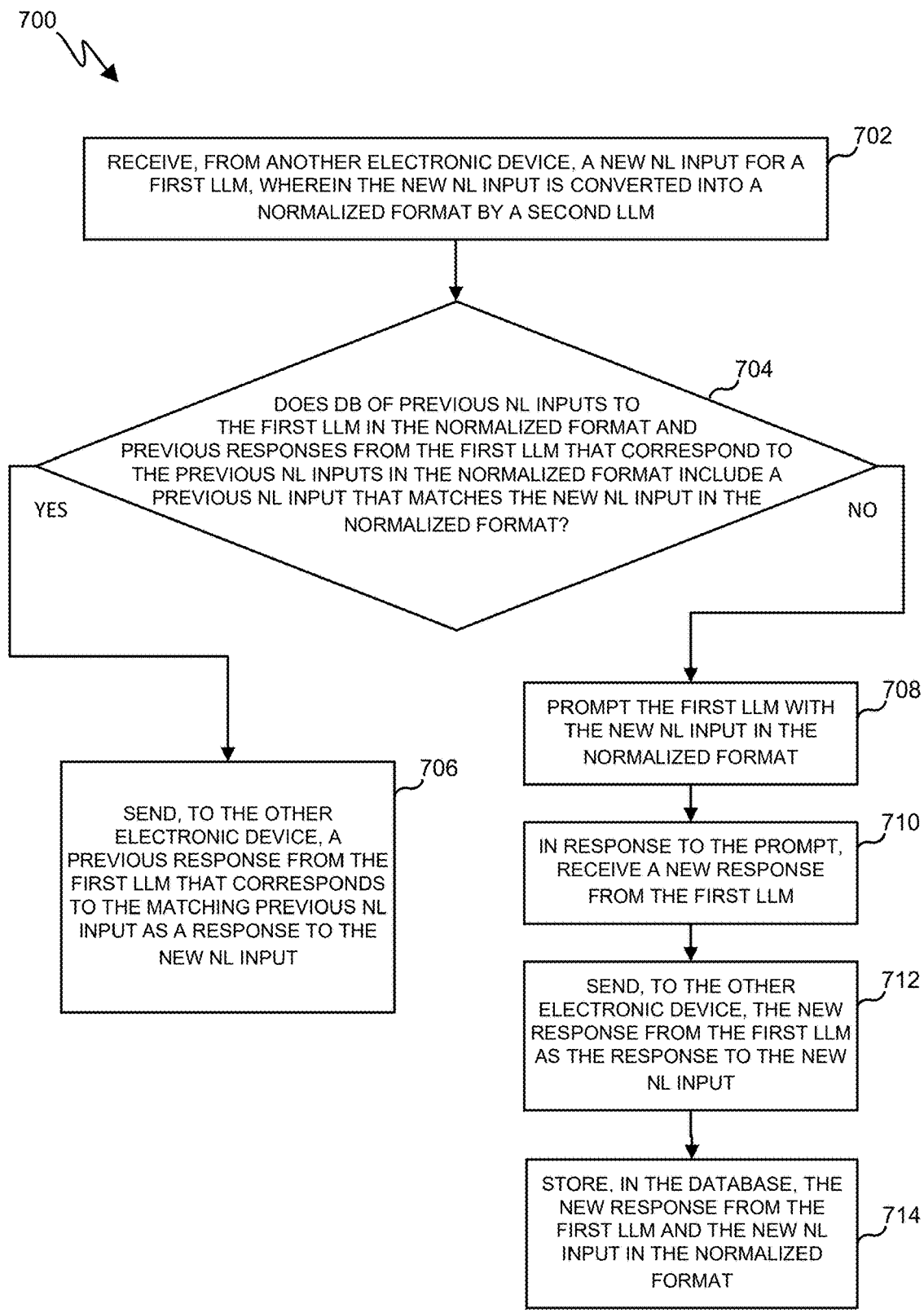
FIG. 7 illustrates an example method for smart resource optimization caching for LLMs in accordance with this disclosure.

FIG. 7 illustrates an example method 700 for smart resource optimization caching for LLMs in accordance with this disclosure. For ease of explanation, the method 700 shown in FIG. 7 is described as being performed by the electronic device 101 in a system using the server 106 in the network configuration 100 of FIG. 1. However, the process 300 may be used with any other suitable combination of devices (such as multiple servers 106) or with any one suitable electronic device (such as the server 106 or the electronic device 101) and in any other suitable system(s).

At block 702, a processor of the device receives, from another electronic device, a new NL input for the first LLM, wherein the new NL input is converted into the normalized format by a second LLM. In some embodiments, the second LLM is implemented in the other electronic device and the new NL input for the first LLM is received from the other electronic device in the normalized format. In other embodiments, the processor prompts the second LLM to convert the new NL input for the first LLM into the normalized format (e.g., when the second LLM is implemented on the electronic device).

At decision block 704, the processor determines whether a database (or cache) of previous NL inputs to the first LLM in the normalized format and previous responses from the first LLM that correspond to the previous NL inputs in the normalized format includes a matching previous NL input that matches the new NL input in the normalized format. The database may be stored in a memory of the electronic device.

At block 706, based on a determination at decision block 704 that the database includes the matching previous NL input, the processor sends, to the other electronic device, a previous response from the first LLM that corresponds to the matching previous NL input as a response to the new NL input.

Otherwise, at block 708, based on a determination at decision block 704 that the database does not include the matching previous NL input, the processor prompts the first LLM with the new NL input in the normalized format. In response to the prompt, at block 710, the processor receives a new response from the first LLM. Then, at block 712, the processor sends, to the other electronic device, the new response from the first LLM as the response to the new NL input. Finally, at block 714, the processor stores, in the database, the new response from the first LLM and the new NL input in the normalized format.

In some embodiments, based on a determination that the new response from the first LLM is reusable, the processor also stores, in the database, the new response from the first LLM and the new NL input in the normalized format with a corresponding indicator of a time-to-live. The processor may also remove, from the database, the new response from the first LLM and the new NL input in the normalized format based on expiration of the time-to-live (e.g., at a later time).

In some embodiments in which the second LLM is implemented in the other electronic device, a tone of the new NL input for the first LLM is determined using the second LLM, and the response to the new NL input is converted to an NL response having the determined tone using the second LLM.

In other embodiments (e.g., embodiments in which the second LLM is implemented on the electronic device), the processor prompts the second LLM to determine a tone of the new NL input for the first LLM, and prompts the second LLM to convert the response to the new NL input into an NL response having the determined tone before sending the response to the other electronic device.

Although FIG. 7 illustrates one example of a method 700 for smart resource optimization caching for LLMs, various changes may be made to FIG. 7. For example, while shown as a series of steps, various steps in FIG. 7 could overlap, occur in parallel, occur in a different order, or occur any number of times (including zero times).

Although this disclosure has been described with reference to various example embodiments, various changes and modifications may be suggested to one skilled in the art. It is intended that this disclosure encompass such changes and modifications as fall within the scope of the appended claims.

What is claimed is:

1. An electronic device comprising:
 a memory configured to store a database of previous natural language (NL) inputs to a first large language model (LLM) in a normalized format, and previous responses from the first LLM that correspond to the previous NL inputs in the normalized format; and
 at least one processor operably coupled to the memory and configured to:
  receive, from another electronic device, a new NL input for the first LLM, wherein the new NL input is converted into the normalized format by a second LLM;
  determine whether the database includes a matching previous NL input that matches the new NL input in the normalized format; and
  based on a determination that the database includes the matching previous NL input, send, to the other electronic device, a previous response from the first LLM that corresponds to the matching previous NL input as a response to the new NL input.

2. The electronic device of claim 1, wherein the at least one processor is further configured to, based on a determination that the database does not include the matching previous NL input:
 prompt the first LLM with the new NL input in the normalized format;
 in response to the prompt, receive a new response from the first LLM;
 send, to the other electronic device, the new response from the first LLM as the response to the new NL input; and
 store, in the database, the new response from the first LLM and the new NL input in the normalized format.

3. The electronic device of claim 2, wherein the at least one processor is further configured to:
 based on a determination that the new response from the first LLM is reusable, store, in the database, the new response from the first LLM and the new NL input in the normalized format with a corresponding indicator of a time-to-live; and
 remove, from the database, the new response from the first LLM and the new NL input in the normalized format based on expiration of the time-to-live.

4. The electronic device of claim 1, wherein the second LLM is implemented in the other electronic device and the new NL input for the first LLM is received from the other electronic device in the normalized format.

5. The electronic device of claim 1, wherein:
the second LLM is implemented in the other electronic device,
a tone of the new NL input for the first LLM is determined using the second LLM, and
the response to the new NL input is converted to an NL response having the determined tone using the second LLM.

6. The electronic device of claim 1, wherein the at least one processor is further configured to prompt the second LLM to convert the new NL input for the first LLM into the normalized format.

7. The electronic device of claim 1, wherein the at least one processor is further configured to:
prompt the second LLM to determine a tone of the new NL input for the first LLM; and
prompt the second LLM to convert the response to the new NL input into an NL response having the determined tone before sending the response to the other electronic device.

8. A method performed by an electronic device, the method comprising:
receiving, from another electronic device, a new natural language (NL) input for a first large language model (LLM), wherein the new NL input is converted into a normalized format by a second LLM;
determining whether a database of previous NL inputs to the first LLM in the normalized format and previous responses from the first LLM that correspond to the previous NL inputs in the normalized format includes a matching previous NL input that matches the new NL input in the normalized format; and
based on a determination that the database includes the matching previous NL input, sending, to the other electronic device, a previous response from the first LLM that corresponds to the matching previous NL input as a response to the new NL input.

9. The method of claim 8, further comprising, based on a determination that the database does not include the matching previous NL input:
prompting the first LLM with the new NL input in the normalized format;
in response to the prompt, receiving a new response from the first LLM;
sending, to the other electronic device, the new response from the first LLM as the response to the new NL input; and
storing, in the database, the new response from the first LLM and the new NL input in the normalized format.

10. The method of claim 9, further comprising:
based on a determination that the new response from the first LLM is reusable, storing, in the database, the new response from the first LLM and the new NL input in the normalized format with a corresponding indicator of a time-to-live; and
removing, from the database, the new response from the first LLM and the new NL input in the normalized format based on expiration of the time-to-live.

11. The method of claim 8, wherein the second LLM is implemented in the other electronic device and the new NL input for the first LLM is received from the other electronic device in the normalized format.

12. The method of claim 8, wherein:
the second LLM is implemented in the other electronic device,
a tone of the new NL input for the first LLM is determined using the second LLM, and
the response to the new NL input is converted to an NL response having the determined tone using the second LLM.

13. The method of claim 8, further comprising prompting the second LLM to convert the new NL input for the first LLM into the normalized format.

14. The method of claim 8, further comprising:
prompting the second LLM to determine a tone of the new NL input for the first LLM; and
prompting the second LLM to convert the response to the new NL input into an NL response having the determined tone before sending the response to the other electronic device.

15. A non-transitory computer readable medium containing instructions that when executed cause at least one processor of an electronic device to:
receive, from another electronic device, a new natural language (NL) input for a first large language model (LLM), wherein the new NL input is converted into a normalized format by a second LLM;
determine whether a database of previous NL inputs to the first LLM in the normalized format and previous responses from the first LLM that correspond to the previous NL inputs in the normalized format includes a matching previous NL input that matches the new NL input in the normalized format; and
based on a determination that the database includes the matching previous NL input, send, to the other electronic device, a previous response from the first LLM that corresponds to the matching previous NL input as a response to the new NL input.

16. The non-transitory computer readable medium of claim 15, wherein the instructions when executed further cause the at least one processor to:
prompt the first LLM with the new NL input in the normalized format;
in response to the prompt, receive a new response from the first LLM;
send, to the other electronic device, the new response from the first LLM as the response to the new NL input; and
store, in the database, the new response from the first LLM and the new NL input in the normalized format.

17. The non-transitory computer readable medium of claim 16, wherein the instructions when executed further cause the at least one processor to:
based on a determination that the new response from the first LLM is reusable, store, in the database, the new response from the first LLM and the new NL input in the normalized format with a corresponding indicator of a time-to-live; and
remove, from the database, the new response from the first LLM and the new NL input in the normalized format based on expiration of the time-to-live.

18. The non-transitory computer readable medium of claim 15, wherein the second LLM is implemented in the other electronic device and the new NL input for the first LLM is received from the other electronic device in the normalized format.

19. The non-transitory computer readable medium of claim 15, wherein the instructions when executed further cause the at least one processor to prompt the second LLM to convert the new NL input for the first LLM into the normalized format.

20. The non-transitory computer readable medium of claim 15, wherein the instructions when executed further cause the at least one processor to:
prompt the second LLM to determine a tone of the new NL input for the first LLM; and
prompt the second LLM to convert the response to the new NL input into an NL response having the determined tone before sending the response to the other electronic device.

* * * * *